(12) United States Patent
Brown (10) Patent No.: US 7,302,432 B2
(45) Date of Patent: Nov. 27, 2007

(54) METHOD AND APPARATUS FOR SEARCHING A FILTERING DATABASE WITH ONE SEARCH OPERATION

(75) Inventor: David A. Brown, Carp (CA)

(73) Assignee: MOSAID, Technologies, Inc., Kanata, Ontario (CA)

( * ) Notice: Subject to any disclaimer, the term of this patent is extended or adjusted under 35 U.S.C. 154(b) by 0 days.

(21) Appl. No.: 10/625,320

(22) Filed: Jul. 23, 2003

(65) Prior Publication Data

US 2004/0054655 A1 Mar. 18, 2004

Related U.S. Application Data

(63) Continuation of application No. 09/652,196, filed on Aug. 31, 2000, now Pat. No. 6,633,567.

(51) Int. Cl.
*G06F 17/30* (2006.01)

(52) U.S. Cl. ....................................................... 707/10

(58) Field of Classification Search ................ 707/1, 707/2, 3, 6, 10, 104.1; 370/216, 229, 392, 370/395.3, 389, 398, 400, 458; 714/799; 709/225
See application file for complete search history.

(56) References Cited

U.S. PATENT DOCUMENTS

| | | | | |
|---|---|---|---|---|
| 5,677,910 A | * | 10/1997 | Delaney | 370/402 |
| 5,852,607 A | | 12/1998 | Chin | 370/401 |
| 6,181,699 B1 | | 1/2001 | Crinion et al. | 370/392 |
| 6,219,699 B1 | | 4/2001 | McCloghrie et al. | 709/221 |
| 6,237,061 B1 | | 5/2001 | Srinivasan et al. | 711/108 |
| 6,252,872 B1 | | 6/2001 | Tzeng | 370/360 |
| 6,308,218 B1 | | 10/2001 | Vasa | 709/238 |
| 6,446,131 B1 | | 9/2002 | Khansari et al. | 709/238 |
| 6,633,567 B1 | * | 10/2003 | Brown | 370/395.3 |
| 6,765,866 B1 | * | 7/2004 | Wyatt | 370/229 |
| 6,775,281 B1 | * | 8/2004 | Brown | 370/392 |
| 6,798,775 B1 | * | 9/2004 | Bordonaro et al. | 370/392 |

OTHER PUBLICATIONS

Suba Varadarajan, Virtual Local Area Networks, Aug. 14, 1997, pp. 1-14.*

(Continued)

*Primary Examiner*—Etienne Leroux
(74) *Attorney, Agent, or Firm*—Hamilton, Brook, Smith & Reynolds, P.C.

(57) ABSTRACT

Multiple searches of a filtering database increase the time for filtering a data packet received by a switch. A switch including a translator and a filtering database for performing a single search is presented. The translator provides a translated identifier for an identifier associated with a data packet received by the switch. The translated identifier includes a group identifier corresponding to a virtual LAN group (FID) and a group member number corresponding to an identified virtual LAN (VID). The filter data base stores a static entry and a dynamic entry. The static entry stores a forwarding decision for the data packet associated with the translated identifier. The dynamic entry stores a forwarding decision for the data packet associated with the group identifier included in the translated identifier and the group member number set to don't care. The translated identifier allows a filtering database to provide the forwarding decision stored in the static entry or the dynamic entry for the identifier from a single search operation.

18 Claims, 8 Drawing Sheets

OTHER PUBLICATIONS

Devashish Paul, Ternary DRAM CAM: Now and Future, May 1, 2000, pp. 1-2.*

"Local and Metropolitan Area Networks," *IEEE Standard for Virtual Bridged Area Networks, IEEE std 802.1Q-1998*, Institute of Electrical and Electronics Engineers, Inc., Mar. 8, 1999.

"Local and Metropolitan Area Networks," IEEE Standard for Virtual Bridged Area Networks, IEEE Std 802.1Q-1998, Institute of Electrical and Electronics Engineers, Inc., Mar. 8, 1999.

* cited by examiner

METHOD AND APPARATUS FOR SEARCHING A FILTERING DATABASE WITH ONE SEARCH OPERATION

RELATED APPLICATION

This application is a continuation of U.S. application Ser. No. 09/652,196, filed Aug. 31, 2000 now U.S. Pat. No. 6,633,567. The entire teachings of the above application is incorporated herein by reference.

BACKGROUND OF THE INVENTION

The first Ethernet LAN ("Local Area Network") was implemented on a shared medium, such as a single co-axial cable connecting all devices in the LAN. The shared medium imposed a signal length restriction on the physical medium and a limit to the number of devices that could be connected to the LAN because only one device could transmit data at a time on the shared medium.

A switch provides a means of increasing the size of a LAN by providing a bridge between groups of devices connected on the same physical medium or LAN segment. The LAN can be viewed as multiple LAN segments connected together by one or more switches. For example, if a first port in the switch is connected to a first LAN segment and a second port in the switch is connected to a second LAN segment. The switch acts as a bridge between the LAN segments by forwarding data packets destined for a device connected to the second LAN segment from the first LAN segment.

Each device connected to the LAN segment in the LAN is assigned a unique Media Access Control ("MAC") address. Each data packet includes a MAC source address assigned to the device transmitting the data packet and the MAC destination address of the device to which the data packet is to be forwarded.

The switch determines whether a data packet received on one LAN segment is to be forwarded on another LAN segment by associating a destination MAC address with a port in the switch; that port is connected to the LAN segment on which the MAC address resides. This association may be stored in a static forwarding entry in a forwarding table in the switch. A static forwarding entry is explicitly configured by management action and is not modified during the operation of the switch. For example, if device A is connected to LAN segment A and LAN segment A is connected to port 1 in the switch, a static forwarding entry for device A associates the MAC address for device A with port 1. If device A is physically moved to segment B connected to port 2 in the switch, the static entry in the forwarding table for device A is not automatically updated to forward to port 2 instead of port 1. A reconfiguration of the switch by management action is required to update a static forwarding entry.

The association between a MAC address and a port in the switch can be learned during operation of the switch instead of being explicitly configured in a static forwarding entry in the switch. Learning allows associations between MAC addresses and ports in the switch to be dynamically created and modified during operation of the switch. A learned association is stored in a dynamic forwarding entry in the forwarding table in the switch. In order to learn MAC addresses, the switch listens to data packets transmitted on all LAN segments connected to ports in the switch. The dynamic entry associates the MAC address with the port connected to the LAN segment from which a data packet is sourced.

The switch creates a new dynamic forwarding entry in the forwarding table upon detecting a MAC address stored in the source address field included in a data packet which does not have a corresponding forwarding entry in the forwarding table. The switch updates a dynamic forwarding entry associated with a MAC address each time it receives a data packet sourced from the MAC address.

For example, if the switch sees a data packet on segment A connected to port 1 with MAC address A stored in the source address field, the switch creates a dynamic forwarding entry in the forwarding table for MAC address A. The dynamic forwarding entry associates MAC address A with port 1. Subsequent data packets received from another port in the switch including MAC address A as the destination address are forwarded through port 1. If the device with MAC address A is moved to another LAN segment connected to port 2 in the switch, the switch learns the new association upon receiving a data packet on port 2 from MAC address A. The switch updates the dynamic forwarding entry for MAC address A to forward data packets to MAC address A through port 2 instead of port 1.

Increasing the size of a LAN, by providing multiple LAN segments through the use of a switch, increases the bandwidth of the LAN and thus the number of devices that can be connected to the LAN. However, by increasing the number of devices connected to the LAN, the bandwidth consumed by broadcast traffic also increases. Broadcast traffic increases because upon receiving a data packet for an unknown MAC address, a broadcast packet is forwarded to all devices connected to the LAN in order to learn forwarding information for the unknown MAC address. The broadcast data packet includes a special MAC address sourced by one MAC address, which is forwarded to all other devices connected to the LAN. Unlike unicast traffic; that is, a data packet which is transmitted from a single source address to a single destination address, broadcast traffic cannot be limited to a single LAN segment. Thus, as the number of devices connected to a LAN increases, the amount of broadcast traffic increases, reducing the available bandwidth on the LAN regardless of the number of physical LAN segments in the LAN.

A solution for reducing broadcast traffic in a LAN is provided by logically segmenting the LAN into Virtual Local Area Networks ("VLAN"). A method for logically segmenting a LAN into VLANs is described in the Institute of Electric and Electronic Engineers ("IEEE") P802.1Q standard. In a switch supporting VLANS a broadcast data packet is only forwarded through a port if the port is a member of same VLAN from which the data packet was received. Thus, broadcast traffic is only forwarded to devices which are members of the same VLAN on which the broadcast data packet was sourced.

In a LAN logically segmented into VLANs, each data packet forwarded on the LAN includes a VLAN Identifier ("VID") identifying the VLAN from which the data packet was sourced. Membership of a VLAN is based on an assigned logical address, the VID, rather than a physical address. Thus, members of a VLAN need not be members of the same physical LAN segment. All traffic on the LAN, including broadcast, unicast and Multicast data traffic is restricted to the virtual VLAN on which it is sourced, by limiting the forwarding of traffic to members of the VLAN identified by the VID included in the data packet. A device can only communicate with a member of a VLAN if the device is also a member of the VLAN identified by the VID included in the received data packet. Thus, a VLAN contains broadcast traffic within the VLAN in which the broadcast packet is sourced and provides security for data transfer between members of the VLAN.

By applying VLANs to a LAN, a forwarding decision stored in a static forwarding entry or a dynamic forward entry is dependent on both the VID and the MAC address included in the received data packet. A MAC address may be a member of more than one VLAN requiring either a static or dynamic forwarding entry in the forward table for each VLAN in which the MAC address is a member. If the switch implements independent learning, a plurality of dynamic forwarding entries are provided for a MAC address, one for each VLAN in which the MAC address is learned.

In order to reduce the number of dynamic forwarding entries stored and updated for each learned MAC address, the switch may implement shared learning. Shared learning allows forwarding information learned for a MAC address on one VLAN to be shared by other VLANs in a given set of VLANs. The forwarding information is used for forwarding decisions taken for that MAC address.

To implement shared learning in a switch, each VLAN in the switch is associated with exactly one Filter Identifier ("FED"). For independent learning there is a one-to one correspondence between a VID and a FID. For shared learning, a plurality of VIDs are assigned to a FID. Only the VID is forwarded in a data packet, the FID is randomly assigned by the switch and used internally in the switch. In a shared learning switch all learned information for independent learning or shared learning is stored in a dynamic forwarding entry in the forwarding table associated with a FE) instead of a VID. Explicitly configured forwarding information is stored in a static forwarding entry associated with a VID. A switch may simultaneously support both shared learning and independent learning.

Shared VLAN learning allows learned MAC address information to be shared amongst a set of VLANs because only one dynamic forwarding entry associated with a FID is stored in the forwarding table for the FED. However, even though the MAC address forwarding information is shared amongst the set of VLANs in the FID, the switch only forwards a data packet through a port that is a member of the VLAN from which the data packet was sourced. This forwarding decision can be made through the use of egress filtering. Thus, in a shared learning switch, broadcast traffic is restricted to the VLAN from which it is sourced and security is provided between VLANs.

Figure 1A:
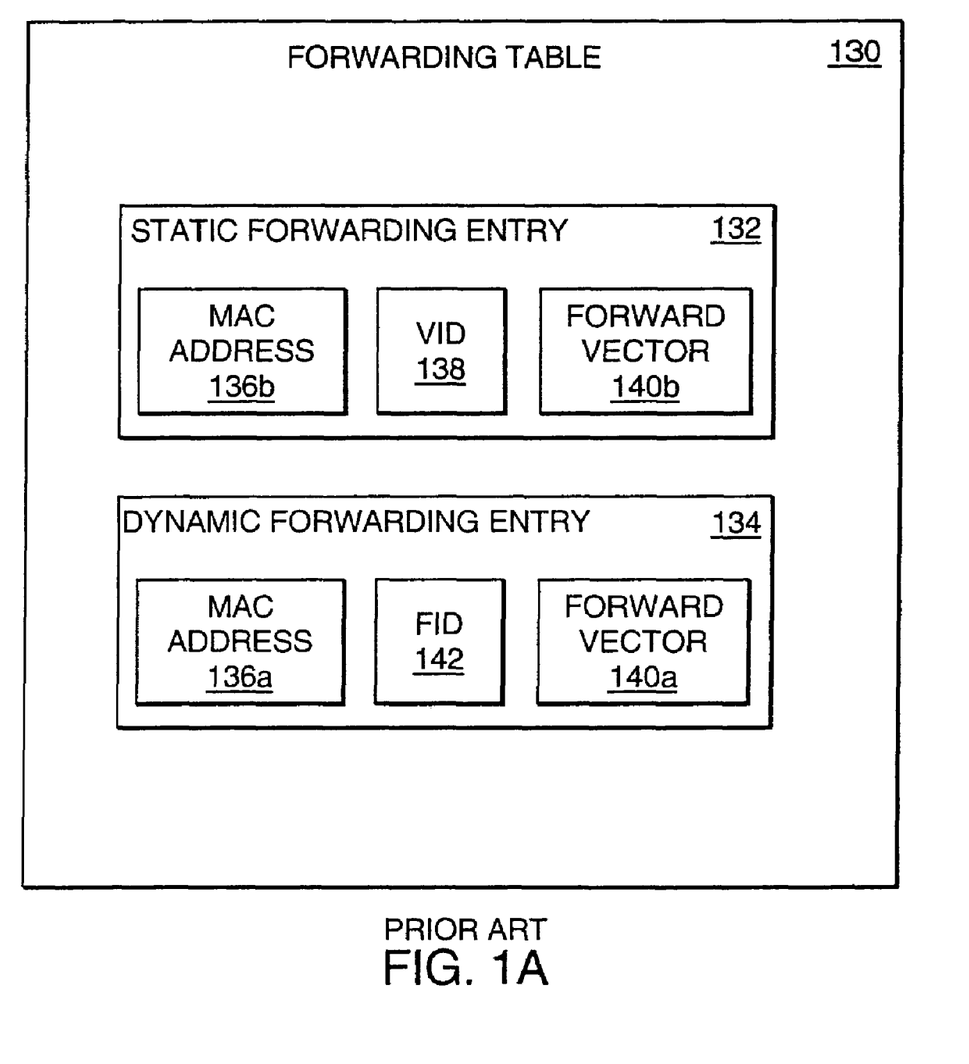
FIG. 1A illustrates a prior art forwarding table 130 implemented in a switch supporting shared learning.

FIG. 1A illustrates a prior art forwarding table 130 implemented in a shared learning switch. The prior art forwarding table 130 includes static forwarding entries 130 and dynamic forwarding entries. The static forwarding entry 132 associates a forward vector 140 with a MAC address 136b and a VID 138. The dynamic entry 134 associates a forward vector 140 with a MAC address 136a and a FID 142. The forward vector 140a, 140b is a bit map including a bit for each port in the switch indicating the port or ports through which the data packet is to be forwarded. The VID 138 in the static forwarding entry 132 is the same VID included in the data packet received by the switch. The FID 142 stored in the dynamic forwarding entry 134 is associated with set of VIDs or a single VID. A forwarding entry associated with the MAC address and the VID included in a received data packet may be stored in a static forwarding entry 132 or a dynamic forwarding entry 134 dependent on whether the MAC address was learned by the switch or explicitly defined by management. Thus, two searches of the forwarding table 130 are required to determine a forwarding decision for a forwarding entry associated with a MAC address and VID included in a received data packet.

The first search searches for a static forwarding entry 132 dependent on the VID 138 included in the data packet, or a default VID. A default VID is assigned to the data packet dependent on the port at which the data packet was received if a VID is not included in the data packet. If there is no static forwarding entry 132 in the forwarding table 130 associated with the MAC address, a second search is performed for a dynamic forwarding entry 134 including the FID 142 assigned to the VID 138 by the switch and the MAC address 136a.

SUMMARY OF THE INVENTION

Multiple searches of a filtering database increase the time for filtering a data packet received by a switch. We present a switch including a translator and a filtering database which performs a single search. The translator provides a translated identifier for an identifier associated with a data packet received by the switch. The translated identifier includes a group identifier corresponding to a virtual LAN group (FID) and a group member number corresponding to an identified virtual LAN (VID). The filter data base stores a static entry and a dynamic entry. The static entry stores a forwarding decision for the data packet associated with the translated identifier. The dynamic entry stores a forwarding decision for the data packet associated with the group identifier included in the translated identifier and the group member number set to don't care. The translated identifier allows a filtering database to provide the forwarding decision stored in the static entry or the dynamic entry for the identifier from a single search operation.

The group identifier included in the translated identifier is stored in both the static entry and the dynamic entry. In the dynamic entry the group member number is set to don't care. Thus, a single search operation can be used to find a match for the identifier which can be stored in either the static entry or the dynamic entry in the filtering database.

In certain embodiments, the group member number identifies one of several members associated with the group identifier. The filtering database may be a Content Addressable Memory. The Content Addressable Memory may be a ternary Content Addressable Memory for supporting a don't care condition.

The identifier may be stored in a header included in the received data packet or a default identifier assigned to the received data packet by the switch.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1B:
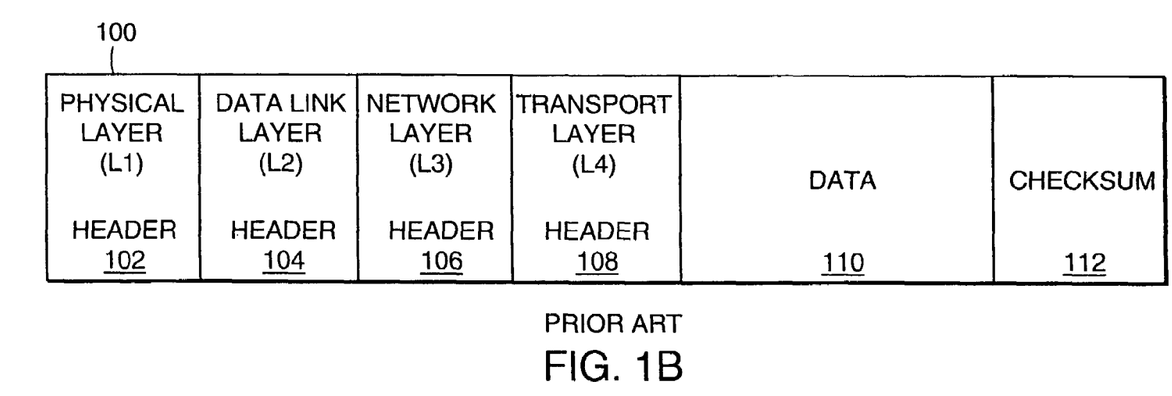
FIG. 1B illustrates a prior art data packet which may be received on an ingress port in the switch.

FIG. 1B illustrates a prior art data packet 100. The data packet includes a physical layer (L1) header 102, a data link layer (L2) header 104, a network layer (L3) header 106 and a transport layer (L4) header 108. A payload for the data packet is stored in a data field 110 and the data packet 100 also includes a checksum 112.

Figure 1C:
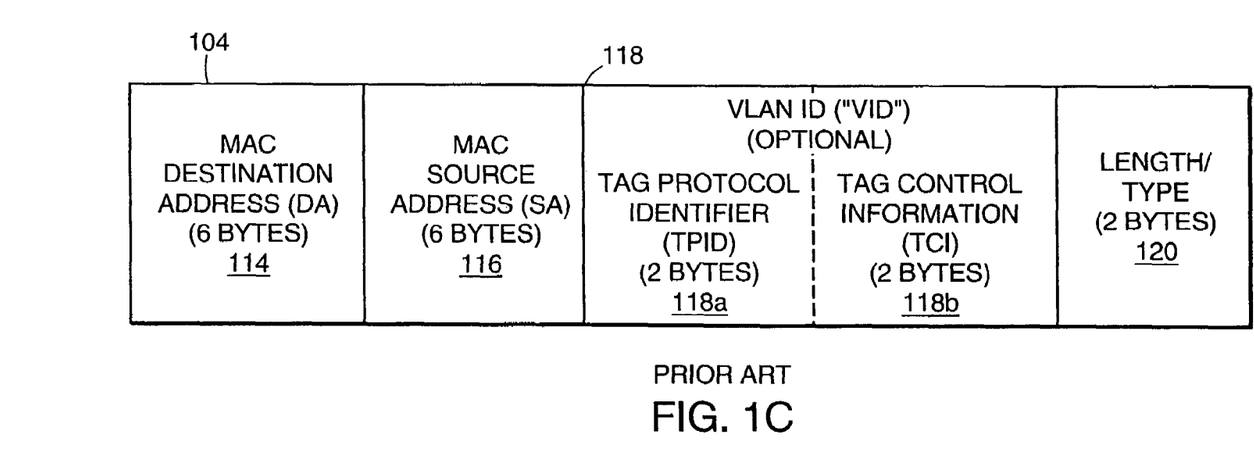
FIG. 1C illustrates a prior art Ethernet data link layer (L2) header which may be included in the data packet shown in FIG. 1A.

FIG. 1C illustrates a prior art Ethernet protocol header stored in the data link (L2) header 104 shown in FIG. 1B. The length of the Ethernet protocol header is a fixed number of bits which is specified by the standard Ethernet protocol. The data link (L2) header 104 includes a 6-byte L2 destination address field 114, a 6-byte L2 source address field 116, a Virtual Local Area Network Identifier ("VID") field 118 and a 2-byte length/type field 120. The VID 118 includes a Tag Protocol Identifier ("TPID") 118a and Tag Control Information ("TCI") 118b.

Figures 2, 2A:
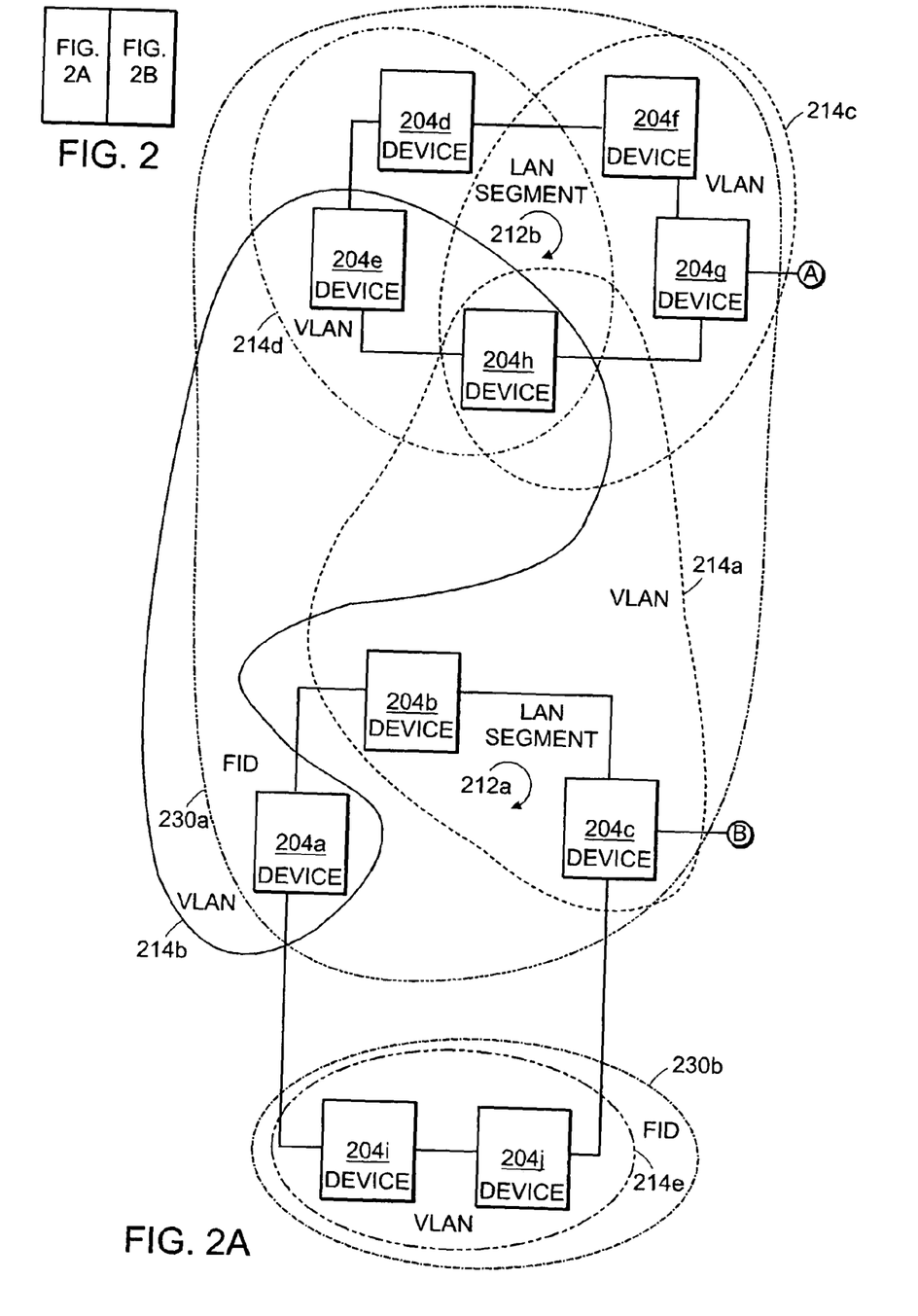
FIG. 2 is a block diagram of a switch including forwarding logic for forwarding received data packets to VLANs connected to ports in the switch.
Figure 2B:
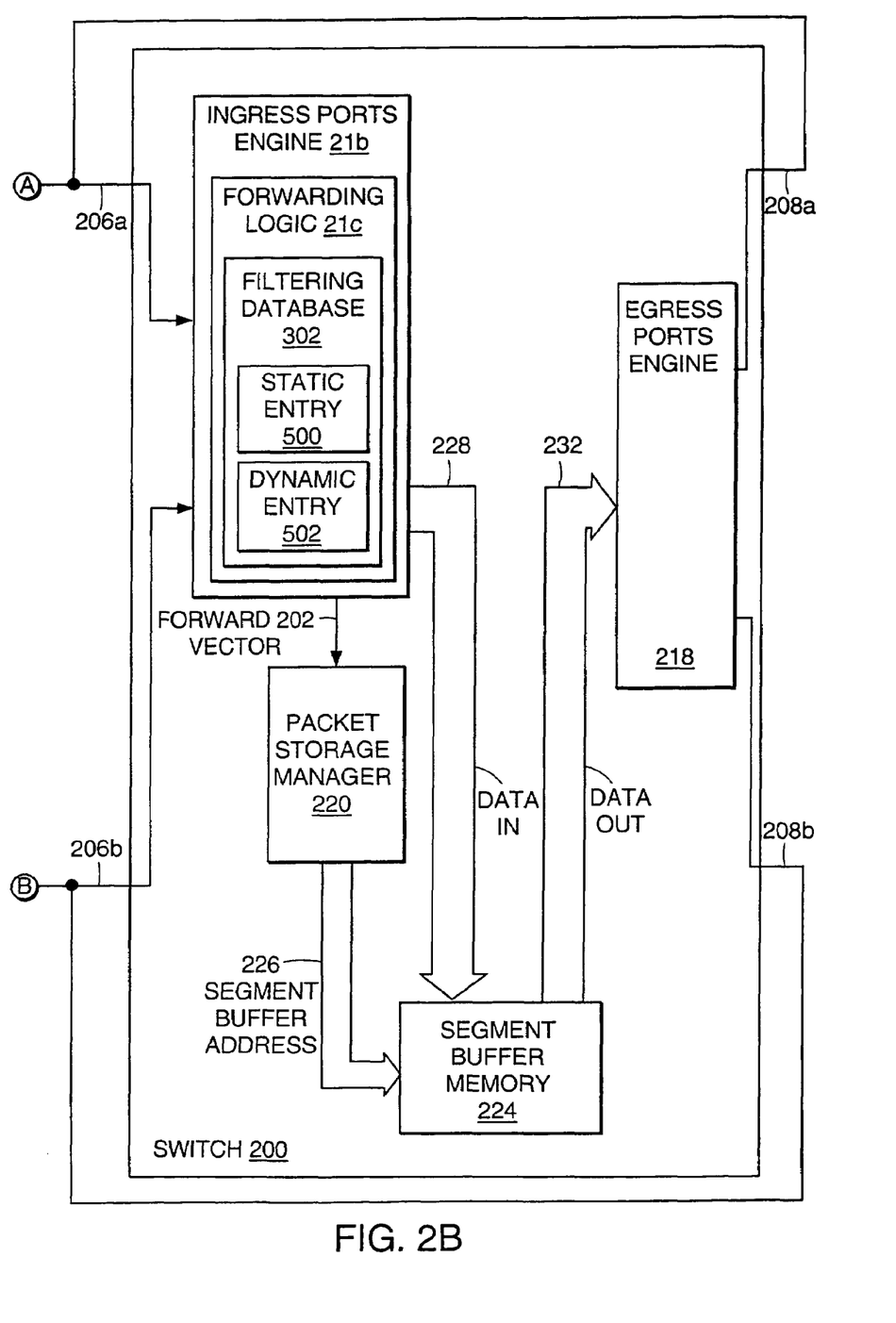

FIG. 2 is a block diagram of a switch 200 including forwarding logic 210 for determining a forwarding decision for data packets received at ingress ports 206a-b. The number of egress ports 208a-b and ingress ports 206a-b is not limited to the two shown in FIG. 2. In one embodiment, twenty-six egress ports 208a-b and ingress ports 206a-b are provided in the switch 200.

The switch 200 includes an ingress ports engine 216, an egress ports engine 218, a packet storage manager 220 and a segment buffer memory 224. Upon receiving a data packet 100 at ingress port 206a or 206b, the forwarding logic 210 in the ingress ports filters the data packet 100 to determine if the data packet 100 is to be forwarded to an egress port 208a-b in the switch 100 or discarded; that is, dropped.

The forwarding logic 210 includes a filtering database 302. The filter data base includes a static entry 500 and a dynamic entry 502. Each static entry 500 and dynamic entry 502 includes a pointer to a forward vector 202. The pointer to a forward vector is associated with a VID 118 (FIG. 1C) and MAC DA 114 (FIG. 1C) included in the data link layer (L2) header 104 (FIG. 1B) of the received data packet. A static entry 500 is explicitly added to the filtering database 302 by management action. A dynamic entry 502 is learned by the switch 200.

A data packet 100 is forwarded if there is a static entry 500 or a dynamic entry 502 stored in the filtering database 302 associated with a VID 118 (FIG. 1C) and MAC DA 114 (FIG. 1C) included in the data packet 100. If no static entry 500 or dynamic entry 502 is provided for the data packet 100, the data packet 100 is dropped. If there is a static entry 500 or a dynamic entry 502, the dynamic entry 500 or the static entry 502 provides the location of a forward vector 202 for the data packet 100. The forward vector 202 identifies one or more egress ports 208a-b through which the data packet 100 is to be forwarded.

Two physical LAN segments 212a-b are connected to the switch 200. Physical LAN segment 212a includes devices 204a-c and 204i-j. Physical LAN segment 212b includes devices 204d-h. A device 204a-j may be a host computer, a client computer, a terminal, a workstation or any other device which can be connected to a LAN. Physical LAN segment 212a is connected to the switch 200 through ingress port 206b and egress port 208b. Physical LAN segment 212b is connected to the switch through ingress port 206a and egress port 208a.

The devices 204a-j connected to physical LAN segments 212a-b are also members of Virtual Local Area Networks ("VLANs") 214a-e. Members of a VLAN 214a-e need not be members of the same physical LAN segment 212a-b because membership of a VLAN 214a-e is based on a logical address rather than a physical address. Members of a VLAN 214a-e are assigned the same logical address or VID. The VID is definable and configurable by management action.

The VID can be stored in the VID field 118 (FIG. 1C) in the data link layer (L2) header 104 of the data packet or can be assigned dependent on ingress port 206a-b by the switch 200 upon detecting a received data packet with no VID. A VID allows members of the same VLAN 214a-e to communicate as if they were on the same physical LAN segment 212a-b. Each device 204a-j can only communicate with a member of a Virtual LAN 214a-e if the device is also a member of the VLAN 214a-e.

VLAN 214a includes devices 204b, 204c and 204h. Virtual LAN 214b includes devices 204a, 204e and 204h. VLAN 214c includes devices 204f, 204g and 204h. VLAN 214d includes devices 204d, 204e and 204h. VLAN 214e includes devices 204i and 204j. Device 204h and device 204e are members of more than one VLAN 214a-d. Device 204h is a member of VLANs 214a-d and device 204e is a member of VLANs 214b and 214d.

A device 204a-j may be a member of more than one VLAN in order to provide a specific service or security within each VLAN. For example, device 204h may be a server computer and devices 204a-g client computers. Thus, in order for device 204h to communicate with devices 204a-g, device 204h must be a member of at least one VLAN 214a-d in which each of the devices 204a-g is also a member.

A set of VLANs 214a-e may be associated with a filter identifier ("FID") to allow shared learning amongst the set of VLANs. In a switch 200 supporting shared learning, each VLAN 214a-e is associated with exactly one FID 230a-b. As shown VLANs 214a-d are members of FID 230a and VLAN 214e is a member of FID 230b. In order to provide shared learning between VLANs 214a-d, the switch assigns a FID 230a to the set of VLAN s 214a-d. Shared learning allows information learned for a MAC address on one VLAN to be shared amongst all VLANs associated with a FID 230a-b. For example, as shown in FIG. 2, device 204h is connected to physical LAN segment 212b and is a member of VLANs 214a-d and FID 230a. Thus, a data packet including a VID for any of VLANs 214a-d and a destination address set to the MAC Destination Address ("DA") for device 204h is forwarded through egress port 208a. If device 204h is moved to physical LAN segment 212a and the new port information is learned through a data packet received from device 204h with VID set to the identifier for VLAN 214a, this information is shared with the other VLANs 214b-d in the FID 230*a* because the set of VLANS share a dynamic forwarding entry associated with the MAC address for device 204*h*.

VLAN 214*e* associated with FID 230*b* supports independent learning. The VLAN 214*a-e* to which a data packet 100 is to be forwarded by the switch 200 is identified by the VID stored in the VID field 118 in the data link layer (L2) header 104 in the received data packet 100. Consider, for a source device 204*e* transmitting a data packet to destination device 204*a* on VLAN 214*b*. Before transmitting the data packet, device 204*e* stores the VID for VLAN 214*b* in the VID field 118 and the MAC address for device 204*a* in the destination address field 114 of the data link (L2) layer header 104. The data packet 100 is received at ingress port 206*a* by the ingress ports engine 216. The forwarding logic 210 in the ingress ports engine 216 selects a forward vector 202 to forward the data packet through egress port 208*b*. The forward vector 202 is associated with a static entry 500 or a dynamic entry 502 in a filtering database 302 in the forwarding logic 210. The forward vector 202 selected is dependent on the VID and the MAC destination address included in the data packet.

Having selected a forward vector 202 for the received data packet 100, the switch 200 stores the data packet 100 forwarded on data_in 228 in segment buffer memory 224. The location at which the data packet is stored is selected by the packet storage manager 220 through segment buffer address 226. The packet storage manager 220 is described in co-pending U.S. patent application Ser. No. 09/386,589 filed on Aug. 31, 1999 entitled "Method and Apparatus for an Interleaved Non-Blocking Packet Buffer" by David A. Brown which is incorporated herein by reference in its entirety. The egress ports engine 218 reads the data packet 100 stored in segment buffer memory on data-out 232 and then forwards the stored data packet to one or more egress ports 208*a-b* selected by the forward vector.

Figure 3:
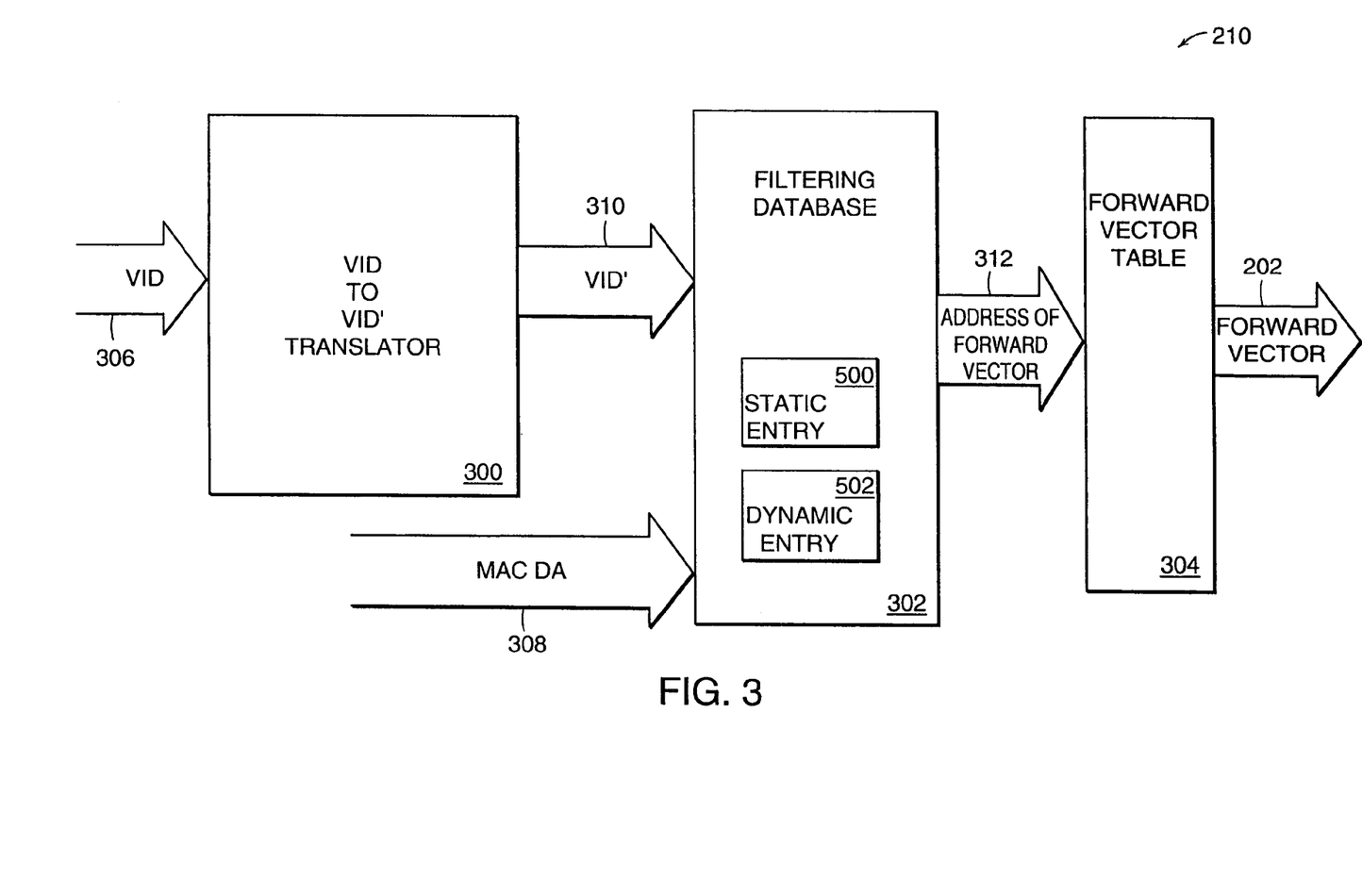
FIG. 3 is a block diagram of the forwarding logic shown in FIG. 2.

FIG. 3 is a block diagram of the forwarding logic 210 shown in FIG. 2. The forwarding logic 210 includes a VID to VID' translator 300, a filtering database 302 and a forward vector table 304.

The filtering database 302 includes a static entry 500 and a dynamic entry 502. A static entry 500 includes a MAC address and a VID. A static entry 500 is explicitly configured by management action. A dynamic entry 502 includes a MAC address and a FID. A dynamic entry 502 is learned by the switch 200. A static entry 500 is selected dependent on the VID associated with the data packet. The VID may be included in the received data packet 100 or assigned by the switch 200. A dynamic entry 502 is selected dependent on the FID assigned by the switch 200 to the VID associated with data packet 100.

Filtering database 302 is preferably a ternary Content Addressable Memory ("CAM") supporting a don't care state. In a CAM, a search key is supplied to the memory through a special comparand register. The CAM returns an address associated with the search key if data stored in the memory matches the search key. The returned address is a pointer to a forward vector stored in the forward vector table 304 associated with the contents of the dynamic entry 502 or the static entry 500. The entire CAM is searched for either a static entry 500 or a dynamic entry 502 matching the search key in a single clock cycle.

A ternary CAM is capable of storing and searching either a logic 0,1, or 'don't care' ("x") in a single cell. If one of the bits stored in static entry 500 or a dynamic entry 502 is set to 'x', a match occurs for a search key storing a '1' or '0' in the bit. For example, if an entry stores "100x", a search key set to "1001" or to '1000' results in a match. The filtering database 302 is described later in conjunction with FIG. 5. The static entry 500 and the dynamic entry 502 stores a translated VID (a VID') associated with a MAC address according to the principles of the present invention. The translated VID) is provided by the VID to VID' translator 300. By storing a translated VID in a dynamic entry 502 and a static entry 500 instead of a storing a VID in a static entry 500 and a FID in a dynamic entry 502, the filtering database 302 can be searched for either a static entry 500 or a dynamic entry 500 in a single search operation using a single search key; that is, a MAC address and a translated VID.

A data packet 100 received at ingress port 206*a* or 206*b* (FIG. 2) may include a VID stored in the VID field 118 (FIG. 1C). If a VID is stored in the received data packet 100, the VID is extracted from the data packet 100 by the ingress ports engine 216 in the switch 200 and forwarded on VID 306 to the VID to VID' translator 300. If there is no VID included in the data packet 100, a default VID is generated by the switch and forwarded on VID 306. In a port-based VLAN, the default VID may be selected dependent on the ingress port 206*a-b* at which the data packet 100 was received.

To search the filtering database 302 for a matching static entry 500 or a dynamic entry 502 associated with a VID and a MAC address in a single search operation, the VID 306 is translated to a VID' 310 by the VID to VID' translator 300. The VID to VID' translator 300 is described later in conjunction with FIG. 4. The VID' 310 and the Media Access Control ("MAC") Destination address ("DA") extracted by the ingress ports engine 216 from the L2 destination address 114 (FIG. 1C) included in the received data packet 100 are forwarded to the filtering database 302.

If a static entry 500 or dynamic entry 502 including the VID' 310 and the MAC DA 308 is found in the filtering database, the address of the forward vector 312 is forwarded to the forward vector table 304. The address of the forward vector 312 is used to select the forward vector 202 stored in the forward vector table 304 associated with the VID stored in the VID field 118 (FIG. 1C) and the MAC DA 114 (FIG. 1C) stored in the received data packet 100.

Figure 4:
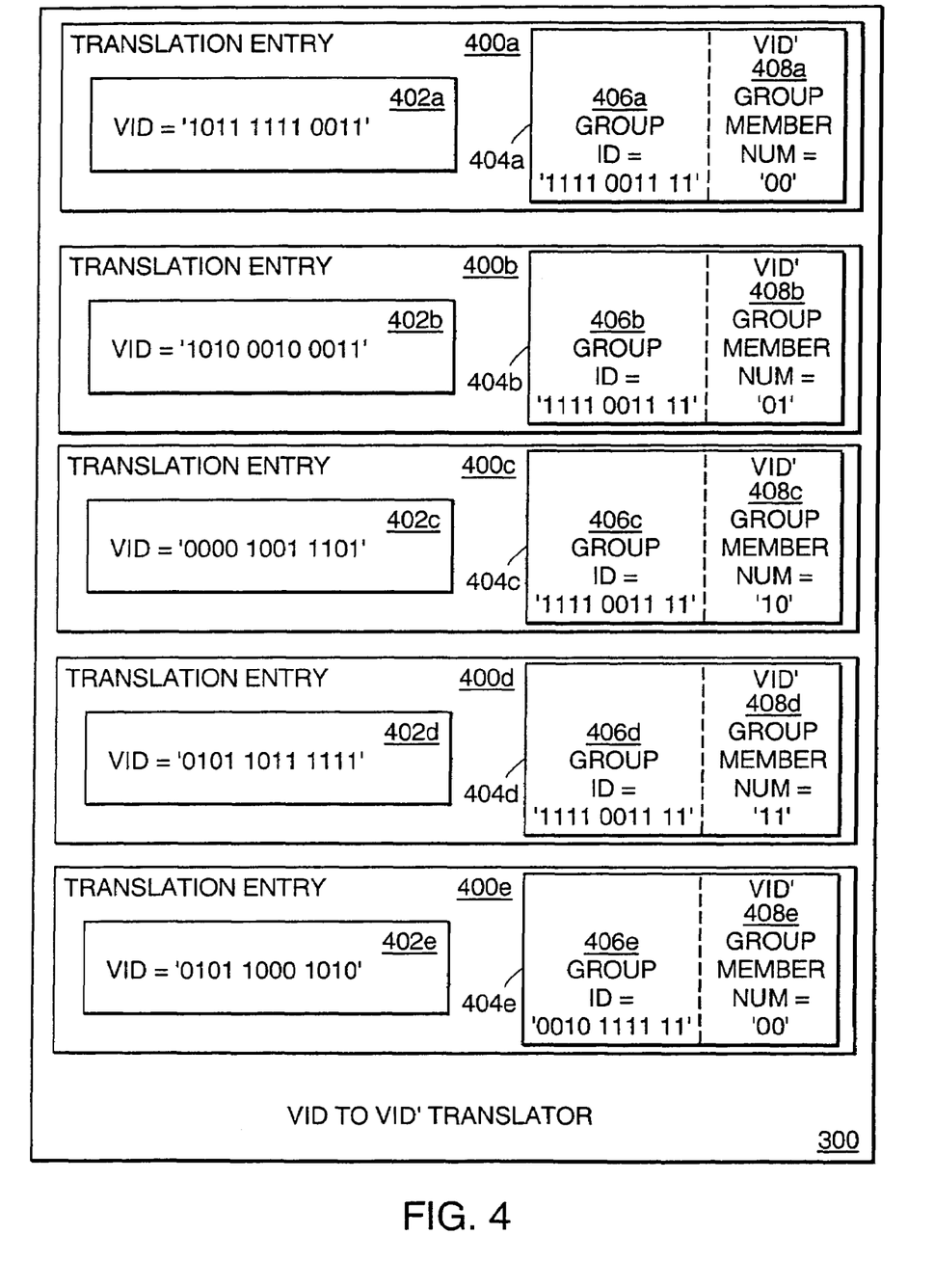
FIG. 4 is a block diagram of the translator in the forwarding logic shown in FIG. 3.

FIG. 4 is a block diagram of the VID to VID' translator 300 shown in FIG. 3. The VID to VID' translator 300 includes translation entries 400*a-e* for each of the VLANs 214*a-e* shown in FIG. 2. VLANs 214*a-d* are members of the same FID 230*a*. Four translation entries 400*a-d* translate VIDs for VLANs 214*a-d* (FIG. 2) to the same FID 230*a*. Translation entry 400*e* translates the VID assigned to VLAN 214*e* to another FID 230*b*.

Each VLAN 214*a-e* has a unique VID) which may be assigned to the VLAN 21 4*a-e* by management action. The VID assigned to each VLAN 214*a-e* is stored in the VID field 402*a-e* of the respective translation entry 400*a-e*. Each translation entry 400*a-e* also includes a respective VID' field 404*a-e*. The VID' field 404*a-e* includes a group identifier field 406*a-e* and a group member number field 408*a-e*. The FID 230*a* assigned to the VLAN or group of VLANs is stored in the group field 406*a-d* of each VID' field 404*a-d*. A group member number is stored in the respective group member number field 408*a-e*. The group member number is unique to each member of a FID 230*a-b*.

The translation entries 400*a-e* are initialized during initialization of the switch 200 dependent on the switch configuration. For example, the translation entries 400*a-e* may be initialized by a switch management utility to map VLANs 214*a-d* to the same FID 230*a* in order to support shared learning. The translation entries 400*a-e* may be modified by management action during operation of the switch.

In a shared learning switch, each VLAN in the switch 200 maps to only one FID 230a-b. A FID 230a-b may include one or more VLANs 214a-e. FIG. 4 illustrates translation entries 400a-e for VLANs 214a-e shown in FIG. 2. As shown, VLANs 214a-d are members of the same FID 230a. VLAN 214e is the only member of another FID 230b. The FID 230b assigned to VLAN 214e is '0010 11111 11'. The FID 230a assigned to VLANs 214a-d is "1111 0011 11". The assigned FID 230a, 230b is stored in the group identifier field 406a-e of each VID' field 404a-e in the respective translation entry 400a-e for the VLAN 214a-e.

The unique VID assigned to each VLAN 214a-e is stored in the VID field 402a-e in the respective translation entry. The VID field 402a in the translation entry 400a for VLAN 214a stores '1011 1111 0011'. The VID field 402b in the translation entry 400b for VLAN 214b stores '1010 0010 0011'. The VID field 402c in the translation entry 400c for VLAN 214c stores '0000 1001 1101'. The VID field 402d in the translation entry 400d for VLAN 214d stores '0101 1011 1111'. The VID field 402e in the translation entry 400e for VLAN 214e stores '0101 1000 1010'.

Each VLAN 214a-e in a group of VLANs is assigned a unique group member number. The group member number assigned to VLAN 214a is '00' and is stored in group member number field 408a. The group member number assigned to VLAN 214b is '01' and is stored in group member number field 408b. The group member number assigned to VLAN 214c is '10' and is stored in group member number field 408c. The group member number assigned to VLAN 214d is '11' and is stored in group member number field 408d. The group member number assigned to VLAN 214e is '00' and is stored in group member number field 408e.

Thus, each VID' field 404a-e includes a group identifier field 406a-e and a group member number field 408a-e for each VLAN 214a-e in a FID 230a, 230b. In the example shown above there are two bits assigned to the group member number, allowing a maximum of four VIDs per FID 230a-b. However, the number of VLANs in a group identified by a FID is not limited to four as in the above example. The number of bits in the group member number field 408a-d is $\log_2$ (maximum number of VLANs per FID). For example, in order to support a maximum of eight VLANs per FID, the group member number requires 3 bits ($\log_2 (8)$).

Figure 5:
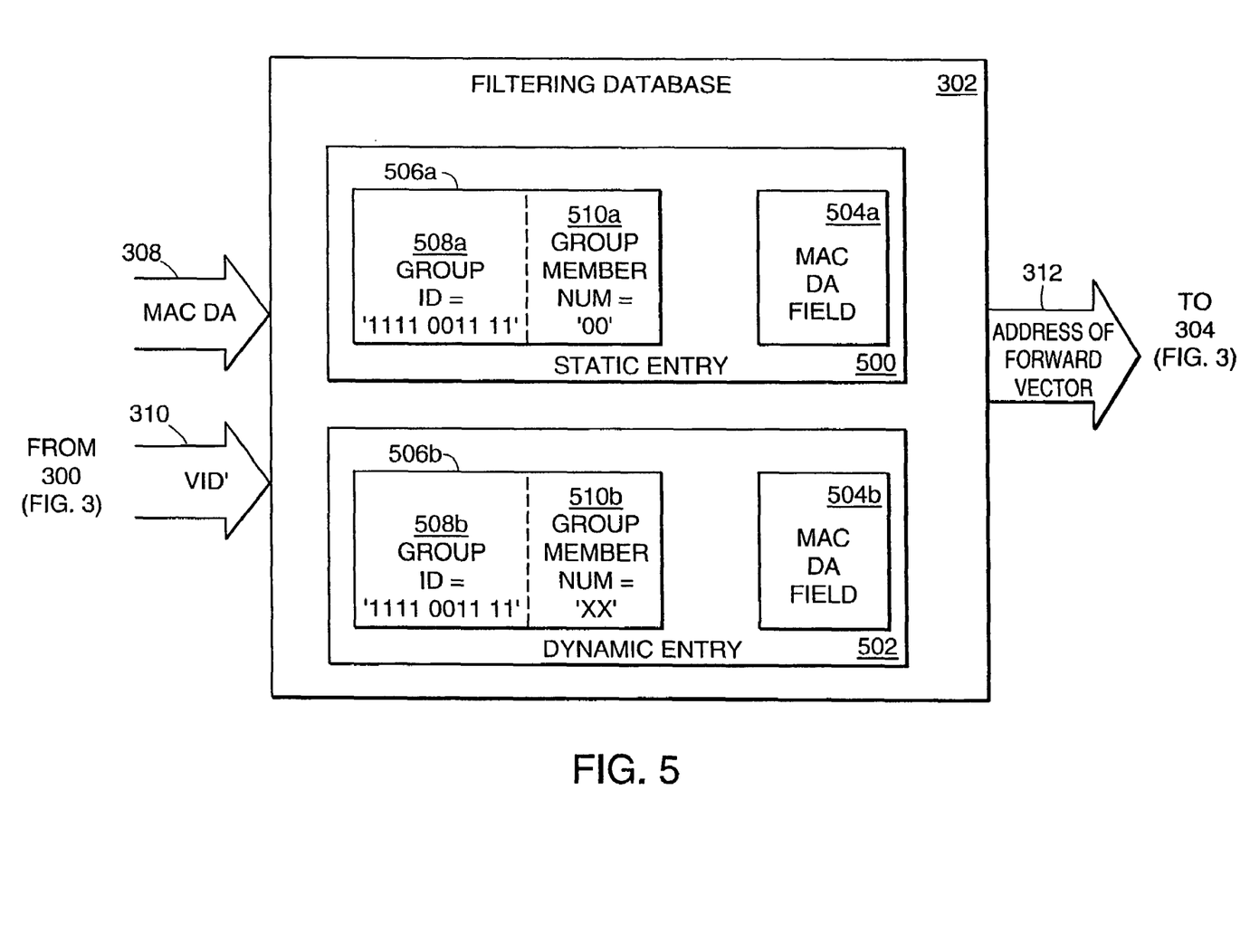
FIG. 5 is a block diagram of the filtering database in the forwarding logic shown in FIG. 3.

FIG. 5 is a block diagram of the filtering database 302 in the forwarding logic 210 shown in FIG. 3. The filtering database 302 includes a static entry 500 and a dynamic entry 502. A static entry 500 is administered and remains constant while the switch 200 is operating. For example, device 204i (FIG. 2) can be configured as a static entry for VLAN 214e (FIG. 2). A dynamic entry 502 is learned and may be overwritten with a new value while the switch 200 is operating. For example, a dynamic entry 502 for device 204a may be overwritten if device 204a is physically moved to another port in the switch 200 requiring updating of the forward vector 202 for device 204a.

Both a static entry 500 and a dynamic entry 502 include a respective filtering database MAC DA field 504a-b and a respective filtering database VID' field 506a-b. Each filtering database VID' field 506a-b includes a filtering database group field 508a-b and a filtering database group member number field 510a-b.

The database group member number field 510a of a static entry 500 stores the same group member number as is stored in the group member number field 408a-e in the VID' field 404a-e in the VID to VID' translator 300 (FIG. 4). The contents of the VID' field 404a-e are forwarded as a VID' 310 to the filtering database 302. Thus, in order to find a matching static entry 500 in the filtering database 302 for a VID' 310, both the group identifier 406a-e and the group member number 408a-e in the VID' 310; that is, the search key must be an exact match.

One dynamic filtering database entry 502 is stored per MAC DA associated with a FID 230a-b. The dynamic filtering database entry 502 is shared amongst the set of VLANs in the FID 230a-b. Thus, the bits in the filtering database group member number field 510b in a dynamic entry 502 are set to 'xx'; that is, don't cares because the group identifier field 508a is the same for all members of the FID 230a-b and there is only one dynamic filtering database entry 502 which is shared by each VLAN 214a-e in the FID 230a-b.

To find a matching dynamic entry for a VID' 310 and a MAC DA 308 only the group identifier 406a-e forwarded to the filtering database 302 in the VID' 310 must match the filtering database group identifier 508b stored in the dynamic filtering database entry 502 associated with the MAC DA 308. Thus, dynamic filtering database entries 502 and static filtering database entries 500 associated with a MAC DA can be searched with the same VID' 310. A static filtering database entry match is found if both the group field 406a-e and the group member number field 408a-e in the VID' 310 match the respective fields in the static entry 500; that is, there is a static entry associated with the VID 402a-e for the data packet 100. A dynamic filtering database entry match is found if only the group identifier field 406a-e in the VID' 310 matches the respective group identifier field 506b in the dynamic entry 502 because the group member number 510b is set to 'xx' and thus all members of the FID 230a match.

For example, a match for VID='1011 1111 0011' which is translated to '1111 0011 1100' in the VID to VID' translator may be stored in a static entry 500 or a dynamic entry 502. The FID assigned to the VID is '1111 0011 11'. A matching static entry 500 is found for the VID if the filtering database group identifier 508a is set to '1111 0011 11' and the filtering database group member number is set to '00' in the static entry 500. A matching dynamic entry 502 is found for the FID if the filtering database group identifier is set to "1111 0011 11" and the group member number is set to 'xx'; that is, don't cares in the dynamic entry 502. Thus, in a single search for '111 0011 1100', a matching dynamic entry 502 or static entry 500 can be found.

After a matching static entry 500 or dynamic entry 502 is found, the address of the forward vector associated with the matching database entry is forwarded on address of forward vector 312 to the forward vector table 304. The forward vector table 304 stores forward vector entries and forwards a forward vector 202 stored at the address of the forward vector 312 to the packet storage manager 220 as shown in FIG. 2. A forward vector 202 is typically a set of bits, with one bit per port in the switch 200. The state of the corresponding port bit in the forward vector 202 determines whether the received data packet 100 is to be forwarded to the egress port 208a-b. For the switch configuration shown in FIG. 2, the forward vector 202 includes two bits, a bit for egress port 208a and a bit for egress port 208b. The respective port bit is set to "enable forwarding" to enable the received data packet 100 to be forwarded through the respective port.

Figure 6:
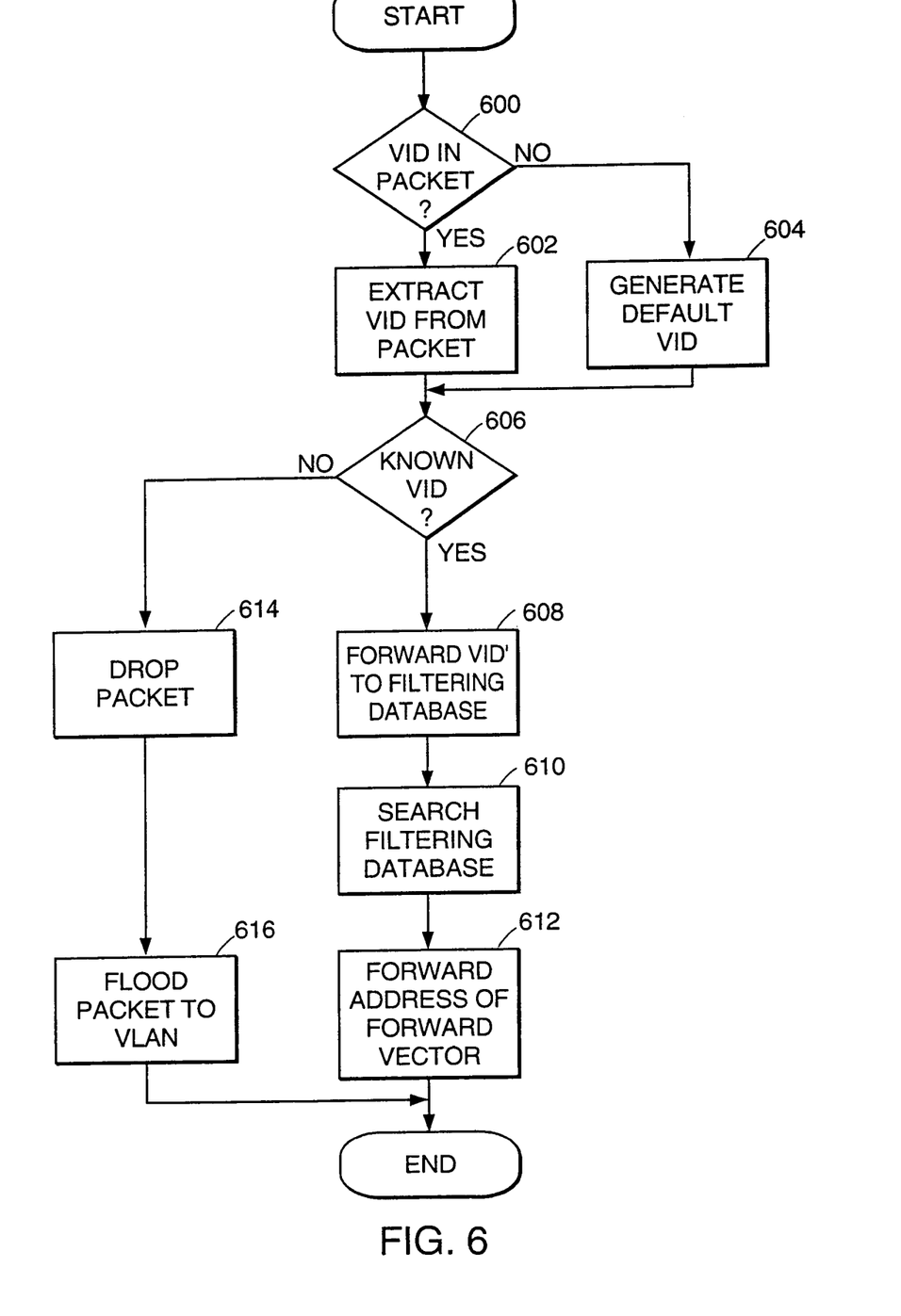
FIG. 6 is a flowchart illustrating a method for selecting a forward vector for a received data packet.

FIG. 6 is a flow chart illustrating a method for selecting a forward vector 202 for a received data packet 100. The method is described in conjunction with FIGS. 3-5.

At step 600, the ingress ports engine 216 examines the received data packet 100 to determine if the data packet 100 includes a VID stored in the VID field 118 (FIG. 1C). If there is a VID stored in the VID field 118 (FIG. 1C), processing continues with step 602. If not, processing continues with step 604.

At step 602, the ingress ports engine 216 extracts the VID stored in the VID field 118 (FIG. 1C) of the received data packet 100. Processing continues with step 606.

At step 604, the ingress ports engine 216 generates a default VID for the received data packet 100. The default VID may be generated dependent on the ingress port 206a-b (FIG. 2) at which the data packet 100 was received. Processing continues with step 606.

At step 606, the VID to VID' translator 300 searches for a translation entry for the VID 306. If the VID 306 is known, processing continues with step 608. If not, processing continues with step 614.

At step 608, the VID' 310 corresponding to the VID 306 stored in a translation entry 400a-e (FIG. 4) is forwarded to the filtering database 302. Processing continues with step 610.

At step 610, the filtering database 302 is searched once with a search key. The search key is the MAC DA 308 and the VID' 310. Both static entries 500 and dynamic entries 502 are searched in the single search. A static entry match requires an exact match of the contents of the filtering database group field 508a and the filtering database group member number field 510a of the VID' 310 with the search key. A dynamic filtering database entry 502 match only requires an exact match of the filtering database group field 508b of the VID' 310 with the search key. It is possible to have both a static entry 500 and a dynamic entry 502 for a search key because a static entry 500 is entered by management action and a dynamic entry 502 is learned by the switch. The priority of the entries can be specified when the filtering database 302 is created. If the static entry has higher priority than the dynamic entry 500 and both a static entry 500 and a dynamic filtering database entry 502 are found, the static entry 500 is selected. After a match is found, processing continues with step 612.

At step 612, the address of the matching filtering database entry stored in a static entry 500 or a dynamic entry 502 is forwarded on the address of the forward vector 312 to the forward vector table 304 (FIG. 5). The forward vector 202 is stored at the address of the forward vector 312 in the forward vector table 304 (FIG. 5). The forward vector 202 is the forward vector corresponding to the VID and the MAC DA associated with the received data packet 100. The received data packet 100 is forwarded to the ports selected by the forward vector 202 in the switch 200. Processing is complete.

At step 614, the VID 306 stored in the received data packet 100 is unknown, the data packet is dropped by the switch 200. Processing continues with step 616.

At step 616, after the data packet is dropped, if learning mode is enabled, the switch 100 sends a data packet to every MAC DA in the VLAN in order to learn the forward vector for the MAC DA. After learning the forward vector, the switch 100 creates a dynamic entry 502 in the filtering database 302. Processing is complete.

Each member of a FID is translated such that each member has the same group identifier and a unique group member number. The group member number is stored as 'xx' in a dynamic entry in a filtering database. A single search operation can be used to find a match for a search key stored in either a static entry or a dynamic entry. A single search results in a match for any of the members of a group identified by a group identifier by storing x's for the group member number in the dynamic entry. Thus, the number of searches required to find either a static entry or a dynamic entry in a filtering database in order to make a forwarding decision for a received data packet are reduced.

While this invention has been particularly shown and described with references to preferred embodiments thereof, it will be understood by those skilled in the art that various changes in form and details may be made therein without departing from the scope of the invention encompassed by the appended claims.

What is claimed is:

1. A switch for receiving and forwarding data packets comprising:
    at least one ingress port for receiving data packets, at least one of the data packets associated with a virtual LAN identifier;
    at least one egress port for forwarding the data packets; and
    forwarding logic which provides a translated identifier for the virtual LAN identifier, the forwarding logic comprising:
    a filtering database that provides a forward vector for the translated identifier from a single search of the filtering database.

2. The switch of claim 1 wherein the forwarding logic assigns a default value to the virtual LAN identifier.

3. The switch of claim 1 wherein the translated identifier includes a group identifier and a group member identifier for the virtual LAN.

4. The switch of claim 3, wherein the filtering database includes a first entry and a second entry.

5. The switch of claim 4 wherein the filtering database provides the forward vector associated with the first entry when the translated identifier matches the first entry and provides the forward vector associated with the second entry when only the group identifier portion of the translated identifier matches the second entry.

6. The switch of claim 1 wherein the filtering database is a content addressable memory.

7. The switch of claim 1 wherein the filtering database is a ternary content addressable memory.

8. The switch of claim 1 wherein the virtual LAN identifier is stored in a header included in the received data packet.

9. The switch of claim 1 wherein the forwarding logic further comprises:
    a forward vector table which stores the forward vector associated with the received data packet, the filtering database providing a pointer to the location of the forward vector in the forward vector table.

10. A switch for receiving and forwarding data packets comprising:
    at least one ingress port for receiving data packets, each data packet including a MAC destination address;
    at least one egress port for forwarding the data packets,
    forwarding logic which provides a translated identifier based on a virtual LAN identifier associated with the received data packet, the forwarding logic comprising:
    a filtering database which provides a forward vector corresponding to the translated identifier and the MAC destination address from a single search of the filtering database.

11. The switch of claim 10 wherein the forwarding logic assigns a default value to the virtual LAN identifier.

12. The switch of claim 10 wherein the translated identifier includes a group identifier and a group member identifier.

13. The switch of claim 12 wherein the filtering database includes a first entry and a second entry.

14. The switch of claim 13 wherein the filtering database provides the forward vector associated with the first entry when the translated identifier matches the first entry and provides the forward vector associated with a second entry when the group identifier portion of the translated identifier and the second identifier field match the second entry.

15. The switch of claim 10 wherein the filtering database is a content addressable memory.

16. The switch of claim 10 wherein the filtering database is a ternary content addressable memory.

17. The switch of claim 10 wherein the virtual LAN identifier is stored in a header included in the received data packet.

18. The switch of claim 10 wherein the forwarding logic further comprises:

a forward vector table which stores the forward vector associated with the received data packet, the filtering database providing a pointer to the location of the forward vector in the forward vector table.

* * * * *